United States Patent [19]

Tannehill et al.

[11] Patent Number: 4,930,795
[45] Date of Patent: Jun. 5, 1990

[54] ROTARY DISPLAY FOR SHOPPING CART

[76] Inventors: John M. Tannehill, 2890 Lansdowne Rd., Victoria, Canada, B.C., V8R 3P9; John B. Tannehill, 507 Briarwood Dr., Enterprise, Ala. 36330

[21] Appl. No.: 385,852

[22] Filed: Jul. 26, 1989

[51] Int. Cl.$^5$ .................... B62D 39/00; G09F 19/02
[52] U.S. Cl. ................. 280/33.992; 40/308; 40/482; 280/DIG. 4
[58] Field of Search ............... 40/482, 424, 308, 587; 446/238, 448, 449; 280/33.992, DIG. 4; 116/57

[56] References Cited

U.S. PATENT DOCUMENTS

| | | | |
|---|---|---|---|
| 444,236 | 1/1891 | Rowe | 40/482 |
| 1,010,412 | 12/1911 | Butler | 116/57 X |

*Primary Examiner*—Kenneth J. Dorner
*Assistant Examiner*—J. Bonifanti
*Attorney, Agent, or Firm*—Christensen, O'Connor, Johnson & Kindness

[57] ABSTRACT

A rotary display (10) for printed advertisements (40) is mounted on a shopping cart (12) and advanced by movement of the shopping cart. The rotary display includes an elongated rotary display drum (14) on which the advertisements are disposed. The display drum is drivingly linked by the meshing of a follower gear (62) with a drive gear (60) that is attached to one end (54) of a bowden cable (16). The opposite end of the bowden cable is drivingly linked to a wheel (22) of the shopping cart by a follower gear (64) that meshes with a drive gear (66) mounted on the wheel. Rotation of the shopping cart wheel is transmitted via the bowden cable to the display drum to cause rotational display of the advertisements contained thereon.

15 Claims, 4 Drawing Sheets

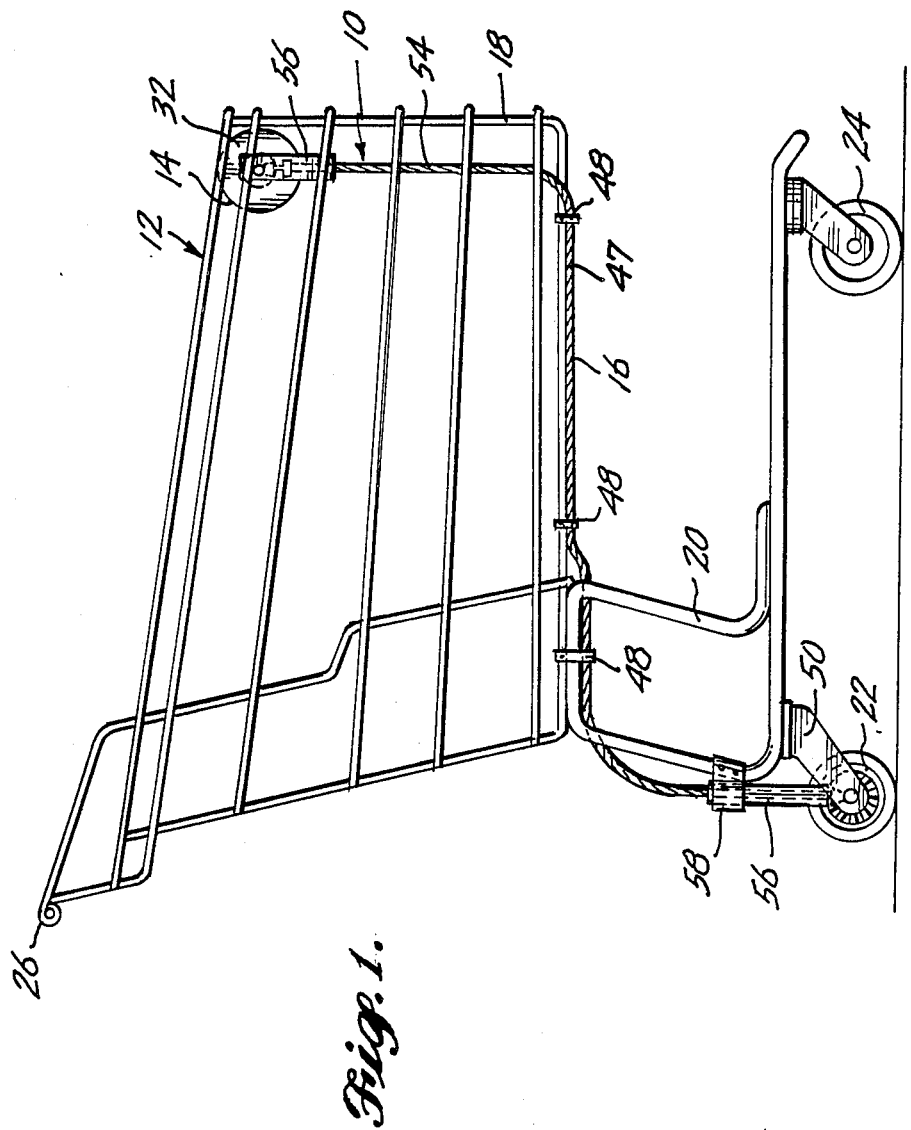

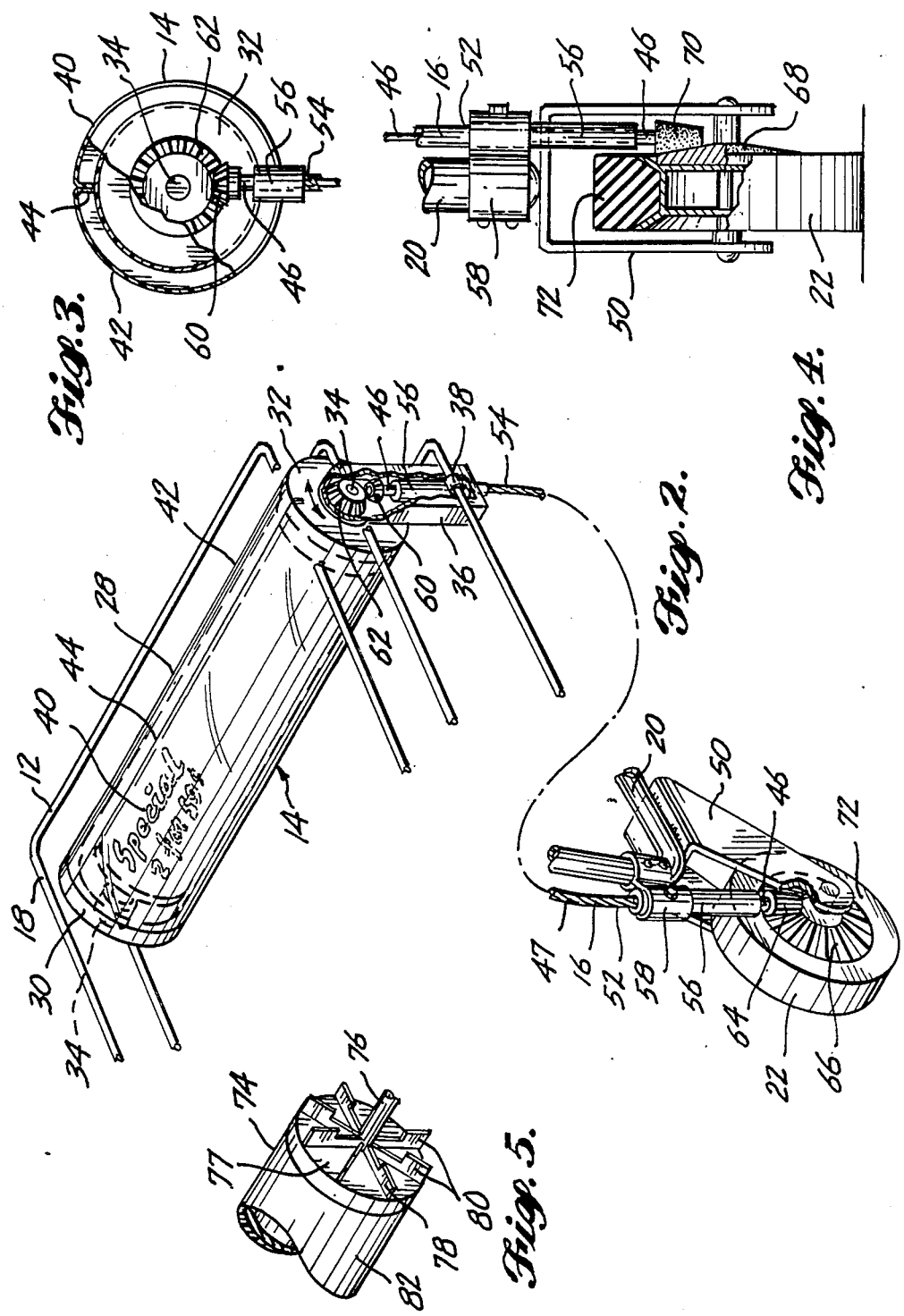

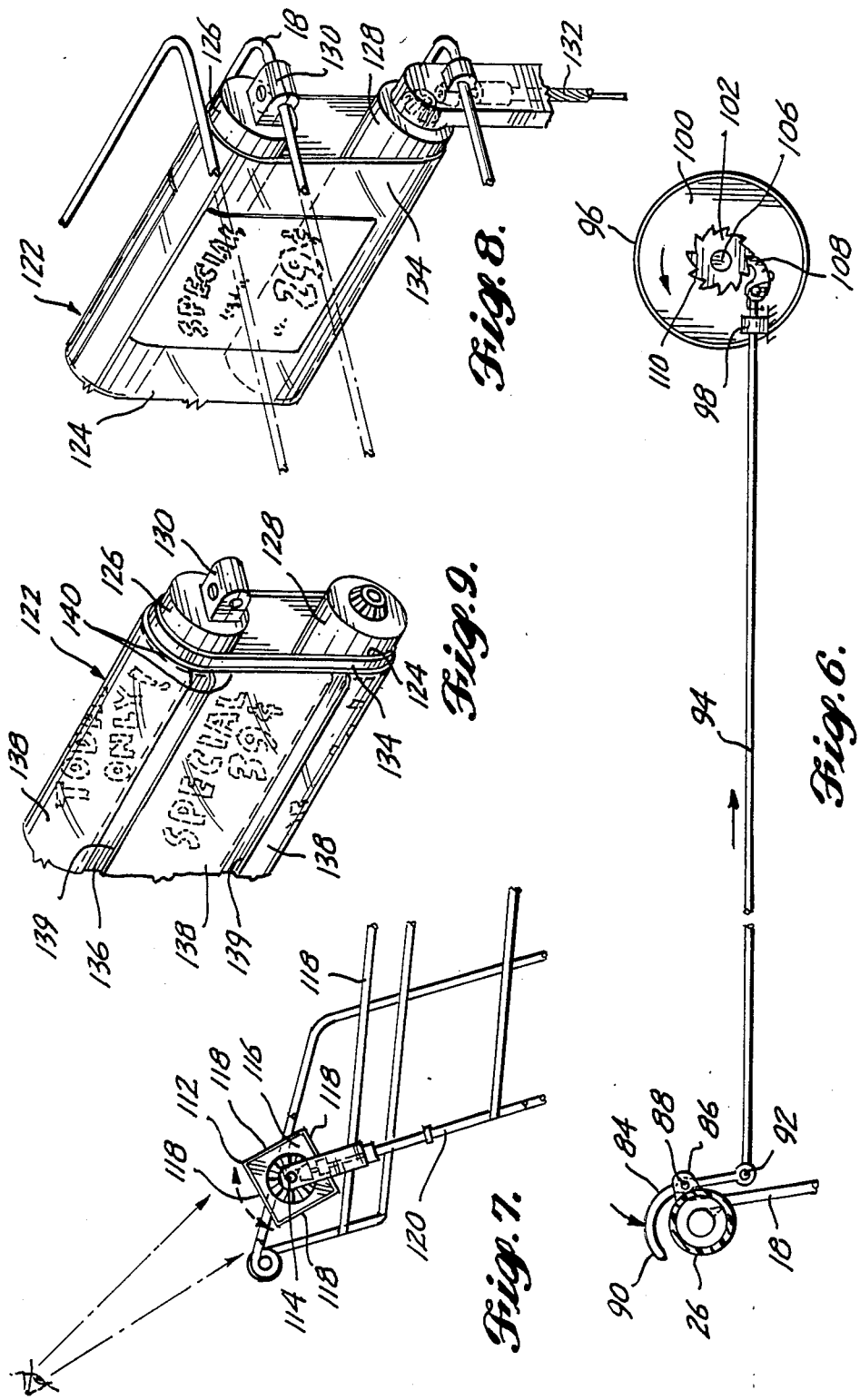

ROTARY DISPLAY FOR SHOPPING CART

BACKGROUND OF THE INVENTION

The present invention relates to a rotary advertisement display for shopping carts, and more particularly to a rotary display that is rotatably advanced by movement of the shopping cart.

Advertisement displays have previously been developed for mounting on shopping carts, and are intended to draw a shopper's attention while the cart is in use. Such displays are typically configured as flat advertising boards or display tubes that are mounted across the width of a shopping cart.

One example of a conventional display is provided by U.S. Pat. No. 4,513,983, issued to Calder, disclosing an elongated octagonal display tube that is mounted adjacent the shopping cart handle, and contains pockets for receiving strips of printed advertisements. A shopping cart user must rotate the display tube by hand to view the various advertisements mounted thereon.

A further example of a conventional display is provided by U.S. Pat. No. 4,021,953, issued to Couch, and also includes a display tube mounted adjacent the shopping cart handle. Again, the viewer must rotate the display tube by turning a knob attached to one end of the tube in order to view the advertisements disposed thereon.

These examples of conventional display tubes are limited in that the user of the shopping cart must take the affirmative step of rotating the tubes by hand to view the advertisements attached thereto. Most shoppers will not undertake this task and thus will not be exposed to the complete range of advertisements contained within the display. As such the shopper will not be motivated to purchase the items or services marketed on the display.

SUMMARY OF THE INVENTION

The present invention discloses a rotary display for shopping carts that includes a display member rotatably mounted to the cart and a drive mechanism that acts to rotate the display member when the shopping cart is moved by the user. This allows the user to be exposed to the full range of advertisements disposed on the display member without necessitating any affirmative action other than simply pushing the shopping cart.

In a preferred embodiment, the rotary display includes a display drum around which printed advertisements are disposed, and a transparent sheath that covers and protects the advertisements. The drive mechanism may comprise a bowden cable drivingly interconnected by gears or frictional drive rollers to one end to the display drum. The other end of the bowden cable is also drivingly interconnected by gears or frictional drive rollers to one of the rear wheels of the shopping cart. The rotational movement of the wheel during travel of the shopping cart is transmitted by the bowden cable to the display drum, resulting in the rotation thereof together with the printed advertisements mounted on the drum.

An alternate drive mechanism may be provided by the mounting of a wind vane to one end of the display drum, with a wind force being generated by movement of the shopping cart. The wind force acts against the vanes to rotate the display member.

Another alternate drive mechanism may be provided by a lever grip pivotally mounted at a fulcrum point on the handle of a shopping cart. A proximal first edge portion of the lever grip is depressed towards the handle when the user grasp both the handle and the lever grip, resulting in advancement of an extension rod that is pivotally mounted to a distal second edge portion of the lever grip. A pawl, secured to the extension rod, engages with a ratchet wheel mounted on one edge of the display drum so that each depression of the lever grip results in rotary advancement of the ratchet wheel and display drum.

In a further aspect of the present invention, a flexible display belt is trained over an idler roller and a vertically displaced drive roller, with the rollers being rotatably mounted on the cart. The idler roller is freely rotatable while the drive roller is driven by a bowden cable linked to a cart wheel. Advertisements are mounted on the outside of the flexible display belt, with the belt being drawn taut over the idler roller and drive roller so that it is advanced by rotation of the drive roller.

BRIEF DESCRIPTION OF THE DRAWINGS

The present invention will presently be described in greater detail, by way of example, with reference to the accompanying drawings in which FIG. 1 is a side elevation view of a preferred embodiment of a rotary display mounted on a shopping cart;

FIG. 2 is a pictorial view showing detail of the drive mechanism utilizing gearing for the rotary display;

FIG. 3 is a side elevation view of the display drum;

FIG. 4 is a rear elevation view with a partial cross section showing the frictional drive mechanical linking of the bowden cable to the shopping cart wheel;

FIG. 5 is a pictorial view of an alternate wind vane drive mechanism;

FIG. 6 is a side elevation view of an alternate lever grip drive mechanism;

FIG. 7 is a side elevational view of a square-tubular display drum;

FIG. 8 is a partial pictorial view of a flexible belt and dual roller display;

FIG. 9 is a partial pictorial view of the belt display of FIG. 8 including advertising display pockets.

DETAILED DESCRIPTION OF THE PREFERRED EMBODIMENT

Figure 10:
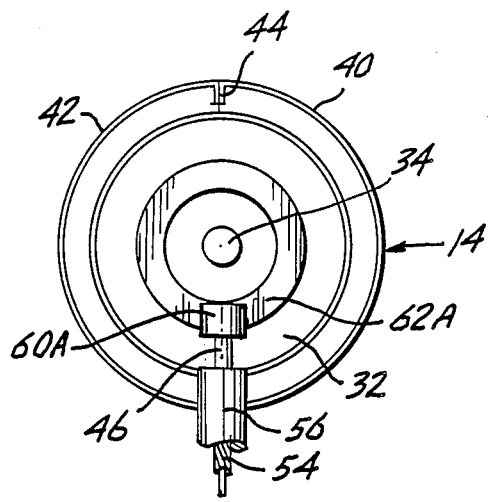
FIG. 10 is a side elevational view of the display drum utilizing frictional drive mechanical linking of the bowden cable to the shopping cart wheel.

A preferred embodiment of a rotary advertisement display 10 mounted in a conventional shopping cart 12 is shown in FIG. 1. The rotary display 10 includes a generally cylindrical display drum 14, on which printed advertisements are disposed. The drum is rotatably mounted on the shopping cart 12 and drivingly connected to a drive mechanism 16.

The shopping cart 12 illustrated is typical of conventional carts, and include an upwardly opening basket 18, formed from a grid of welded rods, for receiving merchandise. The basket 18 is mounted atop an underlying frame 20. Two rear wheels 22 are rotatably secured to a rear end of the cart frame 20, and two front wheels 24 are caster-mounted to the front end of the cart frame. An elongated, cylindrical handle 26 is attached to the cart at the rear of the basket 18.

Referring to the detailed pictorial view of the rotary display 10 in FIG. 2, the display drum 14 includes an elongated cylindrical body portion 28, preferably formed from hollow plastic or metal piping to reduce weight, and two circular end caps 30 and 32 attached to the body portion 28 to close the body portion's ends. The end caps 30 and 32 each have a circular opening at the cap's center point into which is mounted a conventional ball bearing assembly (not shown). Two stub shafts 34 project outwardly from the inner race of the ball bearing assemblies for mounting on the shopping cart 12.

As illustrated in FIG. 2, the display drum 14 is preferably mounted transversely across the width of the basket 18, inside the front side of the basket and adjacent the basket's upper edge. The stub shaft 34 projecting from the end cap 30 of the display drum is detachably secured to the basket 18 by any convenient means, for instance, by a bracket, not shown. The other stub shaft 34, projecting from the end cap 32 of the display drum, is mounted on the basket 18 by insertion into a circular opening formed within a drive housing 36. The drive housing 36 is attached to the basket 18 adjacent the end cap 32 by two clamps 38 that are installed over grid rods of the basket and fastened to the drive housing.

Although the display drum 14 is illustrated in FIGS. 1 and 2 as mounted on stub shafts 34 to extend across the width of the front end of the shopping cart 12, it should be understood that the display drum could be mounted across the shopping cart at other points or mounted vertically with respect to the sidewalls of the shopping cart.

Printed advertisements 40, such as in-store merchandise specials, are preferably mounted on the outer surface of the display drum 14, and may be covered by a substantially transparent flexible sheath 42 formed from a translucent plastic, such as polyester or polyvinylchloride, to protect the advertisements, as shown in FIG. 2. FIG. 3 illustrates one method of mounting the printed advertisements, wherein a printed advertising sheet 40 is wrapped around the drum where it may be secured by any appropriate method such as by an adhesive backing or tape. The protective sheath 42, configured nominally in a cylindrical shape, having a length matching the length of the drum and a diameter slightly greater than the circumference of the drum, is then wrapped around the drum 14 and the advertisement 40, and the mating transverse edges of the sheath are inserted into an elongated slit 44 extending along the length of the drum 14. The sheet thus installed acts to further retain the positioning of the printed advertisement sheet 40 and protect it from dirt.

The display drum 14 is preferably driven by movement of the cart, with several possible drive mechanisms linking the display drum to the cart. In a preferred embodiment of the present invention illustrated in FIG. 2, a bowden cable 16 similar, for instance, to that used in automobile speedometers, is utilized to rotatably link the display drum 14 to a shopping cart rear wheel 22. The bowden cable 16 contains a rotating flexible cable core 46 that is housed within a flexible wire or sheet metal reinforced outer tubular sheath 47. The bowden cable 16 is secured by a series of clamps 48 at various points along the length of the shopping cart 12. Linkages other than a bowden cable may be utilized, such as a rigid rod, although the bowden cable's flexibility makes it ideal for ease of installation.

As illustrated in FIGS. 1 and 2, the rear cart wheel 22, secured by a U-shaped, downwardly extending bracket 50 to the underside of the shopping cart frame 20, is used to drive the rotary display 10. The display could alternately be linked to a castered front wheel 24 of the shopping cart, but the extra plane of rotation of the wheel due to the caster mounting would substantially increase the complexity of the linkage. The bowden cable 16 has a lower, rear end portion 52 that is mechanically linked to the wheel 22, and a forward, upper end portion 54 that is mechanically linked to the rotary display drum 14. The bowden cable end portions 52 and 54 each terminate in a hollow cylindrical end collar 56 that secures the outer sheath 47 of the bowden cable therein and permits free rotation of the inner core 46, with the inner core 46 projecting axially outward from each end collar 56. The end collar 56 securing the lower end portion 52 of the cable 16 is mounted to the shopping cart frame 20 by a clamp 58 located above the wheel 22, with the cable lower end portion 54 being disposed perpendicularly to and adjacent the wheel's axis of rotation. The end collar 56 securing the upper end portion 54 of the cable 16 is mounted within the drive housing 36, with the upper end portion 54 being disposed perpendicularly to the drum 14 axis of rotation adjacent the end cap 32.

Referring to FIG. 3, a preferred method for linking the upper end portion 54 of the bowden cable to the display drum 14 is shown. A small bevel drive gear 60 is axially attached to the rotating core 46 of the bowden cable 16, and meshes with a larger and corresponding beveled follower gear 62 that is axially mounted over the stub shaft 34 and secured to the end cap 32. Rotation of the drive gear 60 results in rotation of the follower gear 62, and thus the display drum 14. If it is desired to slow the rotation of the display drum 14 with respect to the shopping cart wheel 22, one or more intermediate reducing gears, not shown, may be housed in the drum housing 36 and rotatably engaged between the drive gear 60 and the follower gear 62.

In this preferred embodiment, an interconnecting drive gear and follower gear, similar to that discussed above for the display drum interlinking, is also utilized to interconnect the bowden cable 16 to the shopping cart wheel 22, as illustrated in FIG. 2. Specifically, a small frustoconical beveled follower gear 64 is secured to the inner core 46 of the lower end portion 52 of the bowden cable 16, and meshes with a perpendicularly disposed, larger, and correspondingly beveled drive gear 66 that is mounted on the shopping cart wheel 22 about its axis of rotation.

The geared interconnection of the bowden cable 16 to the display drum 14 and the wheel 22 facilitates rotation of the drum even when merchandise is piled in the cart and contacts the outer surface of the drum 14. However, it should be understood that this gearing is only one method for interconnecting the drive system, and that other interconnecting methods may be used. For example, an alternate interconnecting drive system is shown in FIG. 4, utilizing a frictional annular drive surface 68 and a frictional follower roller 70 to interconnect the lower end portion 52 of the bowden cable 16 to the shopping cart wheel 22. The frustoconical rubber-coated follower roller 70 is axially secured to the inner core 46 of the lower end portion 52 of the bowden cable 16, and is disposed adjacent and perpendicular to the central axis of rotation of the wheel 22. The corresponding frustoconical rubber drive surface 68 is secured to the wheel 18 about its axis of rotation adjacent, and contacting, the follower roller 38. The frictional drive surface 68 transmits the roation of the wheel 22 to the end of the bowden cable 16 due to friction present between the follower roller and the drive surface. Although the drive surface 68 and the follower roller 70 are shown with frustoconical configurations in FIG. 4, the frictional drive surface could alternately comprise a flat annular ring, with the drive roller 70 being cylindrical, so long as they are disposed sufficiently close together for frictional interconnection. Also, the annular frictional drive surface 68 may be formed by the sidewall of a rubber tire 72 mounted on the cart wheel 22, rather than by a separate rubber ring mounted about the wheel's axis.

A similar frictional drive could be used to link the bowden cable 16 to the display drum 14, instead of using the gears 60 and 62. A rubber disk (62A) may be secured to the end cap 32 of the display drum 14. This frictional disk surface would contact a frictional drive roller (60A), such as a rubber-coated roller, axially secured to the upper end portion 54 of the bowden cable. The frictional drive roller and follower surface would be sufficiently proximate to transmit rotation of the roller to the display drum.

The above described methods for driving the display drum 14 by interconnection of the drum to the rotation of a shopping cart wheel are provided as examples of possible drive mechanisms. Other alternative linkage mechanisms may be used. One such alternative is illustrated in FIG. 5, and includes a rotational mounting similar to that described above for the first preferred embodiment. A display drum 74 is rotatably mounted transversely across the shopping cart on stub shafts 76 that project outwardly from ball bearings (not shown) housed in drum end caps 77, with the stub shafts 76 being bolted to the shopping cart basket. Located on one, or optionally both, longitudinal end cap 77 of the display drum 74 is a wind vane assembly 78. The wind vane assembly 48 contains a plurality of relatively thin vane blades 80 that project outwardly from the end cap 77 of the display drum 74, and are spaced radially around the stub shaft 76 in a fan-like configuration. As the shopping cart is moved, the vane blades 80 are acted on by reaction with the air, resulting in rotation of the drum 74.

To facilitate this wind vane embodiment in providing reliable rotation of the drum 44, preferably the drum is manufactured of lightweight material, such as a thermoplastic resin or aluminum. A substantially transparent rigid sheath 82 having an inside diameter slightly larger than the outside diameter of the drum 44 may be inserted over the drum 74 and stationarily mounted by brackets (not shown) projecting inwardly from the shopping cart basket so that the drum 74 is free to rotate within the sheath 82. The stationary mounting of the sheath 82 would prevent merchandise piled within the cart from stopping the rotation of the display drum 74.

Another example of an alternate embodiment of the present invention is show in FIG. 6. As illustrated, a drive mechanism for driving a display drum 96 includes a manually graspable grip lever 84 that is mounted adjacent the shopping cart handle 26. The grip lever 84, as illustrated, is preferably constructed from an elongated rectangular sheet of metal or plastic, and is formed to curve across its width, with the radius of curvature corresponding to but larger than the diameter of the handle 26. The grip lever is disposed parallel to and overlying the portion of the handle 26 facing the basket 18 of the shopping cart. The grip lever extends between two mounting flanges 86 that project from the handle 26 forwardly towards the cart basket.

The grip lever 84 is pivotally secured to the flanges 86 by stub pins 88 to create a fulcrum point for pivoting of the grip lever 84. This arrangement results in a proximal top elongated curved edge portion 90 of the grip lever 84 being nominally spaced away from and adjacent the uppermost longitudinal edge of the shopping cart handle 26.

The corresponding curvature and proximate spacing of the grip lever 84 and handle 26 results in both the grip lever and the handle being grasped by a user for movement of the cart. Grasping the grip lever 84 and shopping cart handle 26 causes the top edge portion 90 of the grip lever to be depressed downward towards and against the shopping cart handle 26, with the grip lever pivoting upon the fulcrum point located at the stub pins 88. The pivoting of the grip lever 84 results in forward movement of a distal, bottom edge portion 92 of the grip lever 84, which normally is disposed to project tangentially downward from the forward surface of the shopping cart handle 26.

An elongated push rod 94 serves as an extension rod to connect the grip lever 84 to the cylindrical display drum 96. The push rod has a first end that is pivotally secured to the bottom edge portion 92 of the grip lever 84. The push rod 94 is in turn slidably secured to one side of the cart basket 18 by one or more mounting clamps 98. The forward end of the push rod 94 projects towards an adjacent end cap 100 of the rotary display drum 96, with the display drum mounted transversely across the front end of the shopping cart.

A toothed ratchet wheel 102 is mounted over a stub shaft 106 and is secured to the end cap 100 of the rotary drum 96 about the drum's axis of rotation 106. A pawl 108 is pivotally mounted on the forward end of the push rod 94, and engages between teeth 110 formed around the circumference of the ratchet wheel 102. Depression of the grip lever 84 results in the advancement of the push rod 94 towards the front end of the cart, causing advancement of the ratchet wheel 102 by the pawl 108 and the corresponding rotation of the display drum 96. A spring (not shown) is mounted between the top edge portion 90 of the grip lever 84 and the handle 26 to bias the grip lever 84 away from its depressed position, causing the push rod 94 to retract towards the rear of the cart 12 when the handle 26 is released. Subsequent grasping of the shopping cart handle 26 as a shopper moves about a store results in the incremental advancement of the display drum 96 to display the full circumference of printed advertising secured thereon. A shopper may rapidly and repeatedly squeeze and release the handle 26 and the grip lever 84 to view the entire drum surface, if desired.

In the illustrations of FIGS. 1-6, preferred embodiments of a rotary display drum are shown each having a generally cylindrical configuration, but other shapes are possible. One such alternative example is that of the square cross sectioned tubular display member 112 illustrated in the cross-sectional view of FIG. 7. The square cross sectioned display member 112 may be mounted rotatably along its longitudinal axis on stub shafts 114 projecting from ball bearings (not shown) installed in the center of end caps 116, similar to the mounting of the cylindrical drums in the prior figures. The planar, elongated faces 118 of the outer surface of the display member 112 provide pronounced distinguishment of the different advertising messages contained thereon. Although the display member 112 is illustrated as mounted across the front of the cart basket 18, it may be mounted elsewhere on the cart as desired. The display member 112 may be rotatably driven by a bowden cable 120, as described in the previous preferred embodiment.

It is to be understood that other configurations for the rotary drum are possible, such as one including differing numbers of substantially planar faces included on its outer surface to form, for instance, octagonal or hexagonal cross sections. As another example of an alternative drive configuration, the display member could comprise an annular disk-shaped member having advertisements displayed on the outer surface thereof.

Another alternate configuration for the display member is illustrated in FIGS. 8 and 9, which show a rotary belt display 122 that includes a flexible, endless display belt 124 to present a relatively flat advertisement surface to the shopping cart user. The flexible display belt 122 is trained over, and drawn taut, by two parallel, vertically displaced rollers, with the upper roller 126 serving as an idler roller and the lower roller 128 serving as the drive roller. The idler roller 126 is freely rotatably mounted transversely across the upper portion of the front end of the shopping cart by any convenient method, for instance by insertion of stub shafts (not shown) that project axially from the ends of the roller into ball bearings (not shown) housed within mounting blocks 130 that are bolted or otherwise secured to the basket 18. The drive roller 128, preferably has a similar diameter and is rotatably mounted on the shopping cart and spaced vertically below and parallel to the idler roller 126, by stub shaft and roller bearing assemblies similar to that described above with respect to FIGS. 1 and 2. The drive roller 128 is drivably linked to the movement of the cart by a drive mechanism, such as a bowden cable 132 that is connectable to a wheel of the cart (not shown), similar to the drive mechanisms described previously.

The display belt 124 may be formed of any appropriate, strong, flexible material, such as a cloth-reinforced rubber sheet, a metal screen, or plastic laminated cardboard, etc. The display belt 124 has an outer surface 134 to which advertisements may be secured, for instance, by adhesives or tape. Alternately, as shown in FIG. 9, the outer surface 134 of the belt 124 may be covered by a substantially transparent flexible plastic film 136 that is in turn secured around one side edge of the belt. One or more pockets 138 are formed between the inside of the plastic film 136 and the outer surface 134 of the display belt 124. As illustrated in FIG. 9, the flexible plastic film 136 may be joined to the display belt 124 along various adhered lines 139, extending transversely across the width of the belt, to define a plurality of pockets 138. Printed advertisement sheets 140 may be mounted on the display belt 124 by insertion into the pockets 138.

Rotatable advancement of the drive roller 128 by the bowden cable 132 results in movement of the belt 124, which passes over the surface of the freely rotating idler roller 126. The idler roller 126 may be spring biased (not shown) upwardly away from the drive roller 128 to maintain the necessary tension required to reliably drive the display belt.

In the preferred embodiments illustrated in FIGS. 8 and 9, the drive roller 128 and inner surface of the display belt 124 are rubber coated to produce high frictional coefficients. However, other methods of engaging the drive roller 128 with the display belt 124 are possible, such as the attachment of a sprocket gear (not shown) at one or both ends of the drive roller 128, with corresponding perforated holes located around the circumference of the display belt 124 to engage with the sprocket gear during rotation of the drive roller 128.

Several other alternate configurations for the drive belt display of FIGS. 8 and 9 are possible. For instance, instead of using a separate display belt 124 on which advertisements are disposed, the advertisements could be printed directly onto a sheet of plastic laminated cardboard that is formed into a belt by joining its edges with staples. The flexible cardboard sheet would act both as the belt and the advertising medium.

Other means of advancing the drive roller 128 are possible, such as the push rod and ratchet mechanism of the previous preferred embodiment shown in FIG. 6. Similarly, a plurality of idler rollers could be used in place of a single idler roller to cause the display belt to conform around the outer contours of a shopping cart to increase the total area for advertisement display, or the display belt could alternatively be mounted adjacent the rear or any side of the shopping cart.

The present invention has been described in relation to several preferred embodiments. One of ordinary skill after reading the foregoing specification may be able to affect various other changes, alterations, and substitutes or equivalents without departing from the broad concepts disclosed. It is therefore intended that the scope of Letters Patent granted hereon be limited only by the definitions contained in the appended claims and the equivalents thereof.

The embodiments of the invention in which an exclusive property or privilege is claimed are defined as follows:

1. A manually propellable shopping cart for holding merchandise, comprising:
   (a) a storage bin;
   (b) a frame structure for supporting the storage bin;
   (c) wheels mounted on the frame for rolling movement of the shopping cart during manual propellment;
   (d) a rotary display apparatus for displaying printed matter, the rotary display apparatus including means for receiving replaceable printed matter;
   (e) mounting means for rotatably mounting the rotary display apparatus on the shopping cart in an orientation to enable substantially the entire printed matter to be viewed from the rear of the cart as the cart is being manually propelled; and
   (f) drive train means for rotating the rotary display means through manual propellment of a shopping cart, the drive train means:
   having first coupling means associated with one of the wheels of the shopping cart to transmit torque from the wheel to the drive train means in a first rotational direction during propellment of the shopping cart in a forward direction and in the opposite direction during propellment of the shopping cart in the reverse direction; and
   having second coupling means to transmit torque from the drive train means to the rotary display means to rotate the rotary display means in the first direction during propellment of the cart in the forward direction and to rotate the rotary display means in the opposite direction during propellment of a shopping cart in the reverse direction.

2. The display apparatus of claim 1, wherein the rotary display means comprises a generally diametrically symmetric rotary member rotatably mounted on the rotary members central axis.

3. The display apparatus of claim 2, wherein the rotary member has a generally cylindrical configuration.

4. The display apparatus of claim 2, wherein an outer surface of the rotary member defines a plurality of generally planar faces formed around the rotary member's axis of rotation.

5. The display apparatus of claim 1, wherein the rotary display means is elongated and rotatably mounted transversely relative to the width of the shopping cart at a location at the forward end of the cart.

6. The display apparatus of claim 5, further comprising a substantially transparent sheath positionable to cover an outer surface of the rotary member, formed around the rotary member's axis of rotation, to secure and protect the printed matter disposed thereon.

7. The display apparatus of claim 1, wherein the rotary display means comprises:
  an idler roller rotatably mounted on the shopping cart;
  a drive roller, driven by the drive means, rotatably mounted generally parallel to and spaced away from the idler roller; and
  flexible belt means trained over the idler roller and the drive roller and driven by the drive roller, the belt means supporting printed matter on the exterior of the belt means.

8. The display apparatus of claim 7, wherein the idler roller and the drive roller are mounted transversely relative to the width of the shopping cart.

9. The display apparatus of claim 7, wherein the rotary display means further comprises at least one pocket formed by a sheet of substantially transparent, flexible material secured to the outer surface of the belt means, the printed matter being insertable into the pocket.

10. The display apparatus of claim 1, wherein the drive train means comprises:
  a bowden cable;
  first means for transmitting rotational movement of the wheel to a first end of the bowden cable; and
  a second means for transmitting rotational movement of a second end of the bowden cable to the rotary display means.

11. The display apparatus of claim 1, wherein the first means for transmitting rotational movement of the wheel comprises:
  an annular frictional drive surface formed on the wheel about the wheel's axis of rotation; and
  a frictional follower roller drivingly interconnected to the first end of the bowden cable and contacting the annular frictional drive surface.

12. The display apparatus of claim 1, wherein the first means for transmitting rotational movement of the wheel comprises:
  a drive gear secured to the wheel about the wheel's axis of rotation; and
  a corresponding follower gear drivingly interconnected to the first end of the bowden cable and disposed to mesh with the drive gear.

13. The display apparatus of claim 1, wherein the second means for transmitting rotational movement of the second end of the bowden cable comprises:
  an annular frictional follower surface formed on a first end of the rotary display means about the rotary display mean's axis of rotation; and
  a frictional drive roller drivingly interconnected to the second end of the bowden cable and contacting the frictional follower surface.

14. The display apparatus of claim 1, wherein the second means for transmitting rotational movement of the second end of the bowden cable comprises:
  a follower gear secured to a first end of the rotary display means on the rotary display means' axis of rotation; and
  a corresponding drive gear drivingly interconnected to the second end of the bowden cable and disposed to mesh with the follower gear.

15. The display apparatus of claim 13, further comprising reduction gear means disposed between and meshed with the follower gear and the drive gear.

* * * * *

UNITED STATES PATENT AND TRADEMARK OFFICE
CERTIFICATE OF CORRECTION

PATENT NO. : 4,930,795

DATED : June 5, 1990

INVENTOR(S) : John M. Tannehill et al.

It is certified that error appears in the above-identified patent and that said Letters Patent is hereby corrected as shown below:

Column 2, line 3, "grasp" should be --grasps--
Column 4, Line 68, "roation" should be --rotation--
Column 10, line 4,
 (Claim 11, Line 1), "1" should be --10--
Column 10, line 12
 (Claim 12, line 1) "1" should be --10--
Column 10, line 20
 (Claim 13, line 1) "1" should be --10--
Column 10, line 29
 (Claim 14, line 1) "1" should be --10--
Column 10, line 38
 (Claim 15, line 1) "13" should be --14--

Signed and Sealed this

Twenty-eighth Day of July, 1992

Attest:

DOUGLAS B. COMER

Attesting Officer     Acting Commissioner of Patents and Trademarks